Patented Apr. 10, 1945

2,373,464

UNITED STATES PATENT OFFICE 2,373,464

PROCESS FOR INHIBITING POLYMERIZATION

Harry Robert Dittmar, Wilmington, Del., assignor to E. I. du Pont de Nemours & Company, Wilmington, Del., a corporation of Delaware No Drawing. Application May 22, 1942,
Serial No. 444,120

3 Claims. (Cl. 260—486)

This invention relates to improvements in the manufacture and treatment of unsaturated organic compounds and relates particularly to the treatment of methacrylic acid, and its derivatives.

It is well known that many unsaturated aliphatic carboxylic acids, their esters, and substitution products tend to polymerize on heating. As a consequence, yields are often considerably diminished due to the formation of these polymers during preparation of the monomers, during their subsequent purification by distillation or by other procedural steps, and especially during operations at raised temperatures. This undesirable polymerization is generally inhibited by the addition of a negative catalyst such, for example, as tannic acid, hydroquinone, pyrogallol, copper, sulfur, and the like, and while these negative catalysts are usually quite effective, their use is often undesirable inasmuch as they contaminate the product and either must be neutralized or removed.

An object of the present invention is to provide improved process for inhibiting the polymerization of methacrylic acid and its derivatives. A further object of the invention is to provide an improved process for inhibiting the polymerization of the alkyl methacrylates. Yet another object is to provide a process wherein the esters of methacrylic acid can be formed and the products subsequently recovered without difficulties inherent in the use of polymerization inhibiting catalysts heretofore used. Still another object is to provide a process for inhibiting the polymerization of the aforementioned unsaturated compounds by the employment of oxygen or air. Other objects and advantages of the invention will hereinafter appear.

According to the present invention, polymerization of methacrylic acid and its substitution products can be inhibited by contact with oxygen or air. This is not in full accord with the teachings of the art which are to the effect that oxygen assists in the polymerization of these unsaturated compounds. It has also been found that while the introduction of oxygen is instrumental in preventing polymerization of these compounds under normal temperatures and pressures, its use is most effective at elevated temperatures at which polymerization takes place rapidly. For example, the preparation of these unsaturated compounds usually involves the use of fairly elevated temperatures and it has been determined that if oxygen is injected into the reaction mixture during the reaction and into the distillation columns, whether distillation is conducted under pressure or vacuum, during the recovery of the unsaturated products from the reaction mixture, polymerization will be greatly retarded.

Oxygen may be used to inhibit polymerization during the preparation of methacrylic acid, or its subsequent esterification or other treatment to form its substitution products, and the inhibiting effect is present, whether the monomer is in the liquid or vapor phase providing it is in contact with the oxygen. Its use is especially indicated in the preparation of methacrylic acid esters from acetone cyanhydrin, oleum, and alcohols; and in the dehydrohalogenation of chlorisobutyric acid and subsequent esterification of the product.

Oxygen may be used alone or admixed with an inert vapor or permanent gas such as nitrogen and generally air contains sufficient oxygen to effectively inhibit polymerization. The use is of exceptional value when employed under conditions such that the monomeric compound tends to polymerize at a fairly rapid rate and for the esters of methacrylic acid this occurs at temperatures ranging above approximately 15° C. to the boiling point of the ester which may be as high as 180° C. or higher if elevated pressures are used. The amount of oxygen or air to be employed will be determined by the particular use, for example, in dynamic treatments and distillations, e. g. in continuous processes, there may be used from 0.01 to 10.0 cubic feet of air per pound of the monomeric product passed through the apparatus while in static treatment (e. g. batch processes) or storage from approximately 0.001 to 10 cubic feet of air should be present per pound of actual or potential monomeric material in the reaction mixture.

The examples which follow illustrate the specific embodiments of the invention in which parts are by weight unless otherwise indicated.

*Example 1.*—850 parts by weight of crude acetone cyanhydrin, containing 799 parts of the pure substance, was gradually added over a period of one hour to 1500 parts of oleum, containing 5% free $SO_3$, with stirring and cooling to 90–100° C. The resulting mixture was then heated to 120° C. for from ½ to one hour. Following the heating 480 parts of methyl alcohol containing 0.2 part of hydroquinone and 135 parts of water was added and the mixture heated under reflux for 10 hours. The resulting mixture was then steam distilled and the distillate then salted out with sodium chloride and the ester layer subjected to fractional distillation. It was found that fractional distillation resulted in the formation of polymers in the column even when considerable amounts of hydroquinone were present in the still pot. This difficulty was eliminated by the use of an ebullition tube through which air was bubbled into the still pot during distillation.

Example 2.—400 parts of acetone cyanohydrin and 5 parts of hydroquinone was added to 610 parts of better than 100% sulfuric acid in a suitable reaction kettle, the reaction being started at room temperature and the temperature gradually increased as the addition proceeded until the last portion of the cyanohydrin was added at a temperature of about 100° C. After the addition had been completed the mixture was heated to 115° C. and held at that temperature for at least an hour. The resulting reaction mixture was continuously fed together with air into a reaction vessel provided with a distillation head into which vessel methanol was introduced at substantially an equivalent rate to the removal of the methyl methacrylate distilled. From this vessel methyl methacrylate was distilled at a temperature between 95 and 100° C. into the distillation column into which also oxygen was introduced at the rate of approximately one cubic foot per minute, per 1.5 pounds of the monomer produced per minute. In an attempt to operate the above process without the injection of air but with 0.012 pound of hydroquinone per pound of monomeric methyl methacrylate, polymer formation necessitated shutting down the system after a few days operation, while under the conditions described which employed only 0.0065 pound of hydroquinone per pound of monomer but with the addition of oxygen, difficulties from polymer formation were eliminated.

Example 3.—One mole of pure acetone cyanhydrin was gradually added over a period of approximately one hour to 1½ moles of oleum containing 5% free $SO_3$. During the addition the mixture was stirred and cooled to a temperature between 90 and 100° C. The resulting mixture was then heated to 120° C. for from one-half to one hour following which two moles of ethanol and two moles of water were introduced together with approximately 1% of hydroquinone based on the acetone cyanhydrin used, the mixture was then refluxed for approximately twenty-one hours, during which air was bubbled through the boiling mixture. The product was then steam distilled and during this distillation also air was bubbled through the still, the distillate was washed with brine and vacuum distilled during which air was bubbled through the ester. Approximately a 66% conversion of the acetone cyanhydrin to ethyl methacrylate was obtained with the formation of substantially no polymers.

Example 4.—One mole of crude acetone cyanhydrin containing approximately 94% of the pure substance was gradually added over a period of one hour to one and one-half moles of oleum containing approximately 5% free $SO_3$ with stirring and cooling to a temperature between 90 and 100° C. The resulting mixture was then heated to 120° C. for from one-half to one hour. Following the heating 10 moles of water were added containing approximately 1% hydroquinone and the mixture heated under reflux for four hours during which heating period air was bubbled through the boiling mixture. The reaction mixture was cooled below its boiling point, the supernatant liquid consisting of crude methacrylic acid drawn off, and distilled. Methacrylic acid was recovered in a yield of substantially 70%. Throughout the reaction and distillation substantially no polymers of methacrylic acid were formed.

The polymerization of unsaturated organic compounds of the methacrylic acid series generally can be inhibited by the use of air and/or oxygen and the invention is directed particularly to the inhibition of polymerization of methacrylic acid and its substitution products such, for example, as methacrylonitrile; methacrylic acid amide; and especially methyl methacrylate, and the methacrylate esters of such alcohols as ethanol, n- and iso-propanol, n- and iso-butanol, cyclohexanol, octanol, and higher straight and branch chained alcohol esters of this acid.

While the presence of oxygen and air inhibits the polymerization of the above-designated monomeric compounds it has been desirable in some instances, in order to insure against polymerization of any trapped pools of the monomer which are out of contact with the stream of oxygen or air, to use a minimum amount of a suitable polymerization inhibitor such, for example, as hydroquinone or pyrogallol. Under such circumstances it has been found that as little as 20 parts per million of hydroquinone or pyrogallol is sufficient to insure against polymerization of this nature although, of course, higher concentrations may be used; usually the above limit is ample for adequate protection and in uses wherein the oxygen or air can be brought into contact with the monomeric compounds this concentration can be lowered so that often no inhibitors of this nature are required.

I claim:

1. In a process for the preparation of an alkyl ester of methacrylic acid from a mixture of acetone cyanhydrin oleum and an aliphatic alcohol in the presence of a polymerization inhibitor selected from the group consisting of hydroquinone and pyrogallol, the steps which comprise continuously passing air through the mixture during the reaction, thereafter distilling the alkyl ester of methacrylic acid from the reaction mixture while maintaining direct contact between the vapors of the ester and air.

2. In a process for the preparation of an alkyl ester of methacrylic acid from a mixture of acetone cyanhydrin and an aliphatic alcohol in the presence of hydroquinone, the steps which comprise refluxing the mixture, continuously passing air through the mixture during the refluxing operation, thereafter distilling the alkyl ester of methacrylic acid from the reaction mixture while maintaining direct contact between the vapors of the ester and air.

3. In a process for the preparation of methyl methacrylate from a mixture of acetone cyanhydrin and methanol in the presence of hydroquinone, the steps which comprise refluxing the mixture, continuously passing air through the mixture during the refluxing operation, thereafter distilling the methyl methacrylate from the reaction mixture while maintaining direct contact between the vapors of the ester and air.

HARRY ROBERT DITTMAR.